(12) United States Patent
Fitchett et al.

(10) Patent No.: US 9,119,990 B2
(45) Date of Patent: Sep. 1, 2015

(54) POLYMER COATING TO CROSS-LINK UNDERLYING COVER

(75) Inventors: Derek A. Fitchett, Portland, OR (US); Bradley C. Tutmark, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 917 days.

(21) Appl. No.: 13/090,753

(22) Filed: Apr. 20, 2011

(65) Prior Publication Data

US 2012/0270682 A1    Oct. 25, 2012

(51) Int. Cl.
| | | |
|---|---|---|
| A63B 37/00 | (2006.01) | |
| A63B 37/12 | (2006.01) | |
| A63B 45/00 | (2006.01) | |
| C09D 175/04 | (2006.01) | |
| C08L 75/04 | (2006.01) | |

(52) U.S. Cl.
CPC ......... *A63B 37/0022* (2013.01); *A63B 37/0003* (2013.01); *A63B 37/0029* (2013.01); *A63B 45/00* (2013.01); *C08L 75/04* (2013.01); *C09D 175/04* (2013.01); *A63B 37/0074* (2013.01)

(58) Field of Classification Search
None
See application file for complete search history.

(56) References Cited

U.S. PATENT DOCUMENTS

| | | | |
|---|---|---|---|
| 3,395,109 A | 7/1968 | Molitor et al. | |
| 3,989,568 A | 11/1976 | Isaac | |
| 4,123,061 A | 10/1978 | Dusbiber | |
| 4,248,432 A | 2/1981 | Hewitt et al. | |
| 4,442,282 A | 4/1984 | Kolycheck | |
| 4,808,469 A * | 2/1989 | Hiles | 428/318.6 |
| 5,300,325 A | 4/1994 | Nealon et al. | |
| 5,334,673 A | 8/1994 | Wu | |
| 5,750,580 A | 5/1998 | Mayer | |
| 5,885,172 A | 3/1999 | Hebert et al. | |
| 6,096,851 A | 8/2000 | Maruoka et al. | |
| 6,100,361 A * | 8/2000 | Keller | 528/67 |
| 6,639,024 B2 | 10/2003 | Simonds et al. | |
| 6,645,088 B2 | 11/2003 | Wu et al. | |
| 7,217,200 B2 | 5/2007 | Matroni et al. | |
| 7,390,852 B2 | 6/2008 | Hayashi et al. | |
| 7,481,722 B2 | 1/2009 | Higuchi | |
| 2004/0052970 A1 | 3/2004 | Ohira | |
| 2004/0219995 A1 | 11/2004 | Sullivan | |
| 2005/0079929 A1 | 4/2005 | Tzivanis et al. | |
| 2005/0113187 A1 * | 5/2005 | Marotta et al. | 473/371 |
| 2005/0282660 A1 * | 12/2005 | Isogawa et al. | 473/378 |
| 2006/0089419 A1 | 4/2006 | Hogge et al. | |
| 2007/0142127 A1 | 6/2007 | Tarao | |
| 2008/0085783 A1 | 4/2008 | Isogawa et al. | |
| 2008/0217810 A1 | 9/2008 | Nagasawa et al. | |
| 2009/0062037 A1 * | 3/2009 | Ohama et al. | 473/378 |
| 2009/0247328 A1 * | 10/2009 | Kamino et al. | 473/383 |
| 2011/0070378 A1 | 3/2011 | Melanson et al. | |

FOREIGN PATENT DOCUMENTS

| | | | |
|---|---|---|---|
| DE | 269175 | * | 6/1989 |
| JP | 8182775 | | 7/1996 |
| JP | 08182775 | * | 7/1996 |
| JP | 2004105447 | * | 4/2004 |

OTHER PUBLICATIONS

International Search Report and Written Opinion in PCT application No. PCT/US2012/030990, mailed on Sep. 28, 2012.

* cited by examiner

*Primary Examiner* — David Buttner
(74) *Attorney, Agent, or Firm* — Honigman Miller Schwartz and Cohn LLP; Anna M. Budde; Jonathan P. O'Brien

(57) ABSTRACT

Disclosed is a golf ball including a thermoplastic polyurethane (TPU) cover and a polyurethane coating layer. The cover crosslinks with the coating layer in order to achieve improved durability, specifically improved scuff resistance. The chemical composition of the thermoplastic polyurethane material making up the cover and the chemical composition of the polyurethane coating layer may be chosen so as to be complimentary thereby promoting crosslinking between them. Methods of manufacturing these golf balls are also disclosed.

4 Claims, 4 Drawing Sheets

POLYMER COATING TO CROSS-LINK UNDERLYING COVER

BACKGROUND

The present disclosure relates generally to golf balls and their manufacture. In particular, the present disclosure relates to a golf ball having a thermoplastic polyurethane cover, where the thermoplastic polyurethane cover is crosslinked by the presence of a polyurethane coating layer.

The game of golf is an increasingly popular sport at both the amateur and professional levels. A wide range of golf balls are known, which have any of a variety of constructions made from a diversity of different types of materials. Golf ball covers, in particular, are generally divided into two types: thermoplastic covers and thermoset covers.

Thermoplastic polymer materials may be reversibly melted, and so may be used in a variety of manufacturing techniques such as compression molding or injection molding that take advantage of this property. On the other hand, thermoset polymer materials are generally formed by mixing two or more components to form a cured polymer material that cannot be re-melted or re-worked. Each type of polymer material presents advantages and disadvantages when used to manufacture golf ball covers.

Thermoplastic materials used for golf ball covers usually include ionomer resins, highly neutralized acid polymer compositions, polyamide resins, polyester resins, polyurethane resins, and mixtures thereof. Among these, ionomer resin and thermoplastic polyurethane resin are popular materials for golf ball covers. One popular thermoplastic ionomer material is available from E. I. DuPont de Nemours and Company under the trademark name Surlyn®

However, ionomer resin covered golf balls suffer from the problem that the cover surface may be scraped off by grooves on a clubface during repeated shots, particularly with irons. In other words, ionomer covers have poor scuff resistance. Also, ionomer covered balls usually have inferior spin and feel properties as compared to balata rubber or thermoplastic polyurethane covered balls. The use of softer ionomer resins for the cover will improve spin and feel to some extent, but will also compromise the golf ball's resilience because such balls usually have a lower coefficient of restitution (C.O.R.). Furthermore, the scuff resistance of such softer ionomer covers is often still not satisfactory.

Thermoplastic polyurethane elastomers may also be used as the cover material, as described in (for example) U.S. Pat. Nos. 3,395,109, 4,248,432 and 4,442,282, the disclosures of which are herein incorporated by reference in their entireties. However, the thermoplastic polyurethane elastomers disclosed therein do not satisfy all the requirements of moldability, hitting feel, control, resilience, and scuff resistance.

On the other hand, thermoset polymer materials such as polyurethane elastomers, polyamide elastomers, polyurea elastomers, diene-containing polymer, crosslinked metallocene catalyzed polyolefin, and silicone, may also be used to manufacture golf ball covers. Among these materials, thermoset polyurethane elastomers are popular.

Many attempts, such as are described in U.S. Pat. Nos. 3,989,568, 4,123,061, 5,334,673, and 5,885,172, have been made to use thermoset polyurethane elastomers as a substitute for balata rubber and ionomer resins. Thermosetting polyurethane elastomers are relatively inexpensive and offer good hitting feel and good scuff resistance. In particular, thermoset polyurethane elastomers may present improvements in the scuff resistance as compared to softened ionomer resin blends. However, thermoset materials require complex manufacturing processes to introduce the raw material and then effect a curing reaction, which causes the manufacturing process to be less efficient.

Therefore, various attempts have been made in the golf ball arts to combine the processing advantages of thermoplastic materials with the improved physical properties of thermoset materials. In the particular context of thermoplastic polyurethane covers, a variety of technologies have been used to improve the physical properties of thermoplastic polyurethane covers by exposing the cover to increased amounts of isocynate.

U.S. Pat. No. 7,217,200 to Matroni et al. discloses one such approach, the disclosure of which is herein incorporated by reference in its entirety. This patent discloses a process commonly referred to as isocynate dipping, whereby a thermoplastic polyurethane golf ball cover is dipped into a isocynate curing agent bath. The isocyanate bath crosslinks the thermoplastic polyurethane cover material, thereby increasing its durability and scuff resistance.

U.S. Patent Application No. 2007/0142127 to Tarao discloses another such approach, the disclosure of which is herein incorporated by reference in its entirety. This patent application discloses a golf ball with a thermoplastic polyurethane cover, wherein the cover also includes microcapsules containing a polyisocyanate. After the cover is molded, the golf ball is subsequently heated so as to break the microcapsules and release the polyisocyanate into contact with the thermoplastic polyurethane cover material. The cover thereby achieves increased abrasion resistance and durability.

Finally, U.S. Pat. No. 7,481,722 to Higuchi discloses another method of exposing a thermoplastic polyurethane golf ball cover to increased amounts of isocynate. The disclosure of U.S. Pat. No. 7,481,722 to Higuchi is herein incorporated by reference in its entirety. Specifically, this patent discloses a process for forming a golf ball cover whereby the cover is made from a mixture of a thermoplastic polyurethane, and a polyisocyanate mixed with a thermoplastic material that is not reactive with the polyisocyanate. After this mixture is molded into a golf ball cover, the resulting golf ball is then heated in order to cause the polyisocyanate to crosslink the thermoplastic polyurethane cover material.

However, known technologies for increasing the durability of thermoplastic polyurethane such as the above mentioned examples suffer from various drawbacks and disadvantages. For example, such approaches commonly require extra processing steps in the manufacture of the golf ball, or require that the cover layer be formed from an unusual particular type of thermoplastic polyurethane.

Therefore, there exists a need in the art for a golf ball and related methods of manufacture with thermoplastic polyurethane cover layers having improved physical properties that can be manufactured in an efficient manner.

SUMMARY

Generally, this disclosure relates to a golf ball having a thermoplastic polyurethane cover layer and a polyurethane coating layer surrounding the cover layer, where the cover layer crosslinks with the coating layer. Methods for the manufacture of this golf ball are also disclosed.

In one aspect, this disclosure provides a golf ball comprising: a core; a cover layer substantially surrounding the core, the cover layer comprising a thermoplastic polyurethane material; a coating layer substantially surround the cover layer, the coating layer comprising a polyurethane material; wherein the cover layer is crosslinked with the coating layer.

In another aspect, this disclosure provides a golf ball comprising: a core; a cover layer substantially surrounding the core; the cover layer comprising a thermoplastic polyurethane material, the thermoplastic polyurethane material of the cover layer having an isocyanate index of less than or equal to about 95; a coating layer substantially surround the cover layer, the coating layer comprising a polyurethane material, the polyurethane material of the coating layer having an isocyanate index that greater than or equal to about 105; and the cover layer is crosslinked with the coating layer, the cover layer being crosslinked with the coating layer to a depth into the cover layer of at least about 5% of the thickness of the cover layer.

Finally, in another aspect, this disclosure provides a method for manufacturing a golf ball, the method comprising: receiving a golf ball core; molding a thermoplastic polyurethane material around the core to form a cover layer substantially surrounding the core, the thermoplastic polyurethane material having an isocyanate index of less than or equal to about 95; coating the cover with a polyurethane coating material to form a coating layer substantially surrounding the cover layer, the polyurethane coating material having an isocyanate index of greater than or equal to about 105; and curing the coating layer, such that the thermoplastic polyurethane cover layer crosslinks with the polyurethane coating material.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, this disclosure relates to any type of golf ball having a thermoplastic polyurethane cover layer and a polyurethane coating layer, where the cover layer crosslinks with the coating layer. Various exemplary embodiments of a golf ball in accordance with this disclosure are discussed below and shown in the Figures. However, a golf ball in accordance with this disclosure may generally have any construction, such as a regulation or non-regulation construction. In addition to the representative golf ball constructions discussed, the golf ball may also include any number of additional structural or ornamental layers as may be desired.

Figure 1:
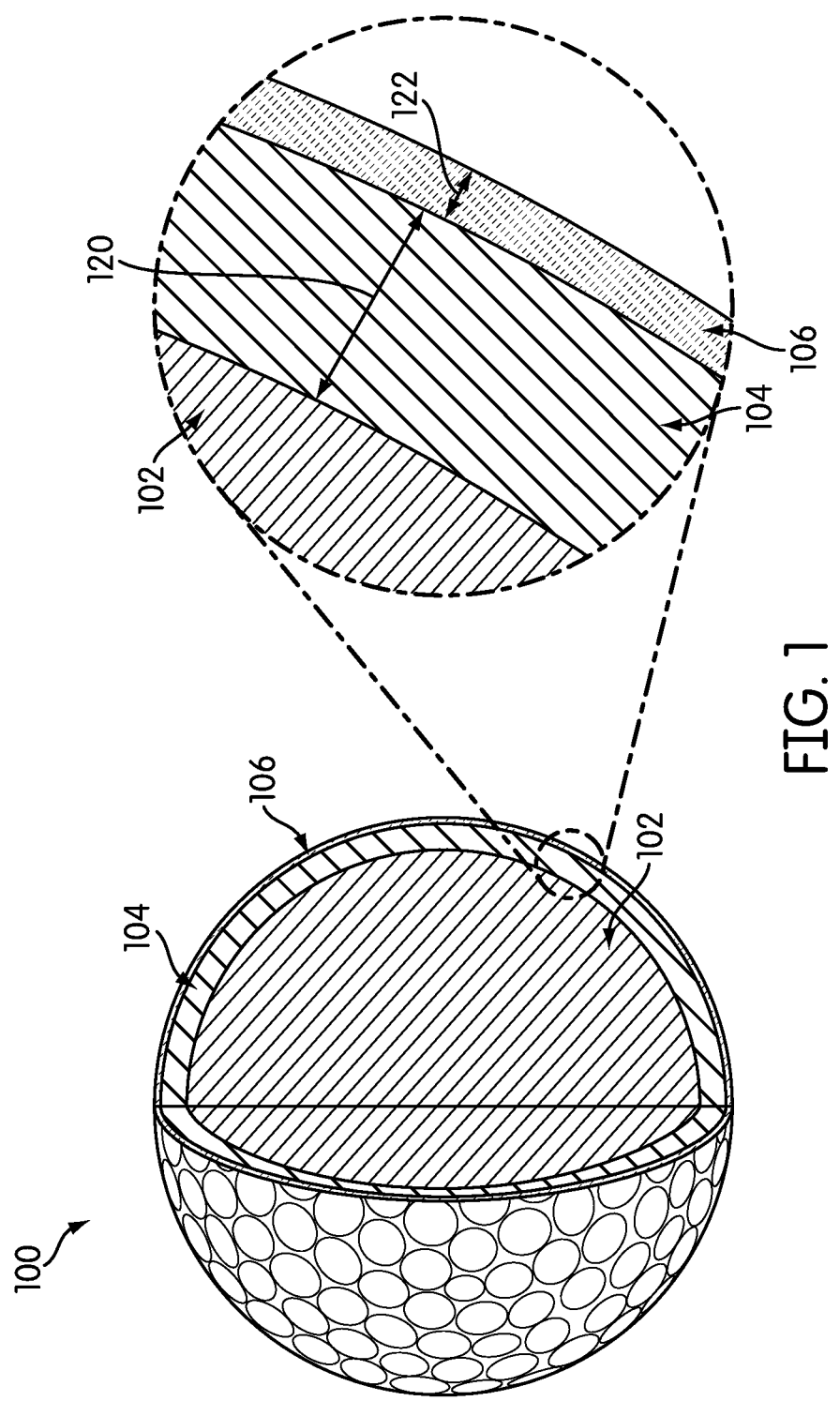
FIG. 1 shows a first embodiment of a golf ball in accordance with this disclosure, prior to crosslinking.

FIG. 1 shows a first embodiment of a golf ball 100 in accordance with this disclosure. Golf ball 100 may include a core 102, a cover layer 104, and a coating layer 106.

First, core 102 may generally be any type of golf ball core. Core 102 may be a solid core or a wound core, and may be made from any of a variety of materials commonly used to make golf ball cores such as (for example) butadiene rubber. In some embodiments, core 102 may be made by a fabrication method such as hot-press molding or injection molding.

Next, cover layer 104 may be made from a thermoplastic polyurethane material. Thermoplastic polyurethanes, also referred to as "TPU," are widely known in the golf ball arts. Thermoplastic materials such as thermoplastic polyurethanes are generally easier to process during manufacturing, and scrap unused materials can be recycled in order to reduce waste and the environmental impact. Chemically, thermoplastic polyurethanes are generally made up of (1) a long chain polyol, (2) a relatively short chain extender, and (3) an isocyanate.

The long chain polyol may be a polyhydroxy compound having a molecular weight between 500 and 4,000. Suitable long chain polyols may generally include linear polyesters, polyethers, polycarbonates, polylactones (e.g., $\epsilon$-caprolactone), and mixtures thereof. In addition to polyols having hydroxyl terminal groups, the polyol may include carboxyl, amino or mercapto terminal groups. The long chain polyol ("the polyol") may generally be a polyester polyol or a polyether polyol. Accordingly, the thermoplastic polyurethane may be either general type of polyurethane: a polyether based polyurethane elastomer or a polyester based polyurethane elastomer, or mixtures thereof.

Polyesters polyols are produced by the reaction of dicarboxylic acids and diols or esterifiable derivative thereof. Examples of suitable dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. Examples of suitable diols include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, and the like. Both of the dicarboxylic acids and diols can be used individually or in mixtures to make specific polyesters in the practice applications.

Polyether polyols may be prepared by the ring-opening addition polymerization of an alkylene oxide with an initiator of a polyhydric alcohol. Examples of suitable polyether polyols are polypropylene glycol (PPG), polyethylene glycol (PEG), polytetramethylene ether glycol (PTMEG). Block copolymers such as combinations of polyoxypropylene and polyoxyethylene glycols, poly-1,2-oxybutylene and polyoxyethylene glycols, poly-1,4-tetramethylene and polyoxyethylene glycols are also preferred in the present invention.

Polycarbonate polyols are made through a condensation reaction of diols with phosgene, chloroformic acid ester, dialkyl carbonate or diallyl carbonate. Examples of diols in the suitable polycarbonate polyols of the thermoplastic polyurethane elastomers are ethanediol, diethylene glycol, 1,3-butanediol, 1,4-butanediol, 1,6-hexanediol, neopentylglycol, and 1,5-pentanediol.

The isocyanate may include any of the known aromatic, aliphatic, and cycloaliphatic di- or polyisocyanates. Examples of suitable isocyanates include: 2,2'-, 2,4'- (and particularly) 4,4-diphenylmethane diisocyanate, and isomeric mixtures thereof; polyphenylene polymethylene polyisocyanates (poly-MDI, PMDI); 2,4- and 2,6-toluene diisocyanates (TDI), and isomeric mixtures thereof such as an 80:20 mixture of the 2,4- and 2,6-isomers; the saturated, isophorone diisocyanate; 1,4-diisocyanatobutane; 1,5-diisocyanatopentane; 1,6-diisocyanatohexane; 1,4-cyclohexane diisocyanate; cycloaliphatic analogs of PMDI; and the like.

Suitable chain extenders may include the common diols, such as ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neopentyl glycol, dihydroxyethoxy hydroquinone, 1,4-cyclo-hexanedimethanol, 1,4-dihydroxycyclohexane, and the like.

In addition to the common diol chain extenders discussed above, diamines and amino alcohols may also be used as the chain extender. Examples of suitable diamines include aliphatic, cyclolaliphatic or aromatic diamines. In particular, a diamine chain extender may be ethylene diamine, hexamethylene diamine, 1,4-cyclohexyene diamine, benzidine, toluene diamine, diaminodiphenyl methane, the isomers of phenylene diamine or hydrazine. Aromatic amines may also be used, such as MOCA (4,4'-methylene-bis-o-chloroaniline), M-CDEA (4,4'-methylenebis(3-chloro-2-6-diethyl-laniline)). Examples of suitable amino alcohols are ethanol amine, N-methylethanolamine, N-butylethanolamine, N-oleyethanolamine, N-cyclohexylisopropanolamine, and the like. Mixtures of various types of chain extenders may also be used to form the thermoplastic polyurethane.

Optionally, the thermoplastic polyurethane material may include further components such as fillers and/or additives. Fillers and additives may be used based on any of a variety of desired characteristics, such as enhancement of physical properties, UV light resistance, and other properties. For example, to improve UV light resistance, the thermoplastic polyurethane material may include at least one light stabilizer. Light stabilizers may include hindered amines, UV stabilizers, or a mixture thereof.

Inorganic or organic fillers can be also added to the thermoplastic polyurethane material. Suitable inorganic fillers may include silicate minerals, metal oxides, metal salts, clays, metal silicates, glass fibers, natural fibrous minerals, synthetic fibrous minerals or a mixture thereof. Suitable organic fillers may include carbon black, fullerene and/or carbon nanotubes, melamine colophony, cellulose fibers, polyamide fibers, polyacrylonitrile fibers, polyurethane fibers, polyester fibers based on aromatic and/aliphatic dicarboxylic acid esters, carbon fibers or a mixture thereof. The inorganic and organic fillers may be used individually or as a mixture thereof. The total amount of the filler may be from about 0.5 to about 30 percent by weight of the polyurethane components.

Flame retardants may also be used to improve the flame resistance of the thermoplastic polyurethane material. Suitable flame retardants may include organic phosphates, metal phosphates, metal polyphosphates, metal oxides (such as aluminum oxide hydrate, antimony trioxide, arsenic oxide), metal salts (such as calcium sulfate, expandable graphite), and cyanuric acid derivatives (such as melamine cyanurate). These flame retardants may be used individually or as a mixture thereof, and the total amount of the flame retardant may be from about 10 to about 35 percent by weight of the polyurethane components.

Therefore, the thermoplastic polyurethane material may be comprised of the above discussed exemplary chemical reactants and additives, as well as other chemical reactants and components as is generally known in the polymer and golf ball arts.

Next, coating layer 106 may be comprised of a polyurethane coating material. Polyurethane clear coats, and other types of polyurethane coating layers, are known to be used on golf balls.

For example, U.S. Pat. No. 7,390,852 to Hayashi et al. discloses a representative polyurethane coating system, the disclosure of which is herein incorporated by reference in its entirety. This polyurethane system includes a polyester polyol and a non-yellowing polyisocyanate. As another example, U.S. Pat. No. 6,639,024 to Simonds et al. also discloses a representative polyurethane coating system, the disclosure of which is herein incorporated by reference in its entirety. This polyurethane coating is a two-component polyurethane, comprised of a polyol and a isocyanate, and may further include a catalyst.

Generally, the polyurethane coating material may be a two-part coating system. A preferred coating system includes (1) a first part comprising a polyol or another compound containing an active hydrogen atom, and (2) a second part comprising a polyisocyanate (or polyisocyanurate) with at least two —N═C═O groups.

Suitable polyols for the polyurethane coating system include both polyether and polyester polyols. In one particular embodiment, the polyol may be a hydroxyl functional polyol having an hydroxyl equivalent weight in the range of from about 50 to about 1500, or an hydroxyl equivalent weight being in the range of from about 200 to about 800. Suitable polyesters for use herein include poly (oxydiethylene adipates) that are condensation products of diethylene glycol and adipic acid, branched with trimethylolpropane or pentaerythritol, and polycaprolactone (hydroxycaproic acid) polyesters.

Suitable polyethers include polymers of propylene oxide or propylene oxide/ethylene oxide. Such materials are usually triols or diols with molecular weights between 1000 and 7000. Suitable examples of polyols include Desmophen® 651A-65, 800, 670A-80, 680-70 and 631A-75, which are saturated polyester resins, commercially available from Bayer Corp.

As mentioned above, in addition to a polyol, the two-part polyurethane system also comprises a polyisocyanate (or polyisocyanurate) with at least two —N═C═O groups, carried in a solvent. Various diisocyantes, including but not limited to hexamethylene diisocyanate (HDI), methylene diisocyanate (MDI), toluene diisocyanate (TDI), and isophorone diisocyanate (IPDI) may be used. In particular embodiments, aliphatic isocyanates may be used. HDI derivatives contemplated for use herein are sold by Bayer Corp. under the trademark DESMODUR®. One such composition is DESMODUR® N-3200, which is a low viscosity biuret of HDI.

The polyisocyanate used herein may have an equivalent weight within the range of from about 100 to about 1,200, or from about 150 to about 300 in some embodiments. The polyisocyanate may be carried in a solvent, with the solvent solution containing from a minimum of about 40%, alternatively about 60%, alternatively about 70%, to a maximum of approaching 100%, and in particular about 85%, by weight of the polyisocyanate.

Suitable solvents for the polyisocyanate include methyl isobutyl ketone, methyl amyl ketone, methyl isoamyl ketone, butyl acetate and propylene glycol monomethyl ether acetate, or mixtures thereof. In a particularly embodiment, the solvent is present in an amount of 20-65 weight %, or in amount of 40-60 weight % based upon the total weight of the coating system. Urethane grade solvents (i.e. low-moisture solvents) may be used in particular embodiments.

The polyurethane coating material may also be formed from a polyurethane system that includes a catalyst. Generally, the catalyst increases the rate of curing. The catalyst may comprises at least one member selected from the group consisting of dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate.

The catalyst may be present in a quantity of 0.01-10 weight active catalyst (not including any carrier) based on total resin solids (polyol plus polyisocyanate, excluding solvents). The quantity of catalyst will depend upon the type of catalyst, polyol, polyisocyanate, and solvents which are used, as well as the curing temperature and desired curing time. For example, when dibutyl tin dilaurate is used as the catalyst, it preferably is present in an amount of about 0.05-0.35 weight % active catalyst based upon total resin solids, and more preferably 0.08-0.15 weight % based upon total resin solids. Generally, the catalyst preferably is present in an amount sufficient to reduce the curing time of the coating as compared to a coating system which does not contain the catalyst but is otherwise identical.

U.S. Pat. No. 6,096,851 to Maruoka et al. also discloses polyurethane coating systems, the disclosure of which is herein incorporated by reference in its entirety. Specifically, this patent discloses polyurethane systems wherein the isocyanate index may be in the range of from 0.5 to 2.0.

As shown in FIG. 1, coating layer 106 may substantially surround cover layer 104. As a result of this physical configuration, as well as the chemical compositions of both the thermoplastic polyurethane cover material and the polyurethane coating material, a chemical reaction takes place between these layers. Namely, the cover material crosslinks with the coating material.

Generally, a thermoplastic polyurethane material does not include a substantial amount of chemical crosslinks between its polymer backbones. Instead, hydrogen bonding occurs in the "hard segments" of the thermoplastic polyurethane made up of the chain extender and isocyanate due to the presence of polar groups therein. This hydrogen bonding is thermally reversible, which allows the thermoplastic material to be reversibly melted and thereby processed in an efficient manner. However, this substantial lack of crosslinks also contributes to the thermoplastic polyurethane having less than desirable physical properties when used as a golf ball cover. The presence of covalently bonded crosslinks between the polymer chains in an (other thermoplastic) polyurethane generally increases its durability.

In the present disclosure, this effect is achieved by crosslinking the thermoplastic polyurethane cover material with the polyurethane coating material. Specifically, the chemical composition of the cover material and the chemical composition of the coating material may be selected so as to be chemically complementary in such a way that the coating material creates crosslinks within the cover. Furthermore, such an arrangement also creates bonds between the cover layer and the coating layer. Golf balls commonly include polyurethane coating layers atop the cover layer. Therefore, golf balls in accordance with this disclosure may achieve improved durability of the cover layer at the same time that the coating layer is applied as part of a standard golf ball manufacturing process.

In some embodiments, the crosslinking may take place as a result of the relative proportions of isocyanate functional groups in the cover layer and the coating layer. As is generally known, polyurethanes (whether thermoplastic or thermoset) are polymerized through the reaction between an isocyanate functional group on a polyisocyanate and a hydroxyl functional group on a polyol. The relative stoichiometric amounts of each of these functional groups is expressed as the "isocyanate index" of the polyurethane system. Namely, the isocyanate index may be expressed as the ratio of the number of isocyanate groups present in the polyurethane system to the number of hydroxyl groups times 100. Or, in other words, the isocyanate index may be expressed as the ratio of the actual number of isocyanate functional groups present in the polyurethane system to the hypothetical number of isocyanate functional groups necessary to fully react with all of the hydroxyl groups present in the polyurethane system.

The isocyanate index may also be referred to as the "NCO index." The location of the decimal place may vary based on common convention (i.e. the value of the isocyanate index may be equally expressed as 1.00 or 100 depending on colloquialism). As used herein, an isocyanate index value of 100 means that the number of isocyanate functional groups present in the polyurethane system is equal to the number of hydroxyl functional groups present in the polyurethane system. An isocyanate index value of less than 100 means that excess hydroxyl groups are present, and an isocyanate index value of greater than 100 means that excess isocyanate groups are present.

In certain embodiments, the isocyanate index of the coating layer may be different from the isocyanate index of the cover layer. Particularly, the isocyanate index of the coating layer may differ from 100 by a first certain amount, the isocyanate index of the cover layer may different from 100 by a second certain amount, where one of the isocyanate index values is above 100 and the other is below 100. More specifically, the isocyanate index of the coating layer may be at least a first predetermine amount above 100, while the isocyanate index of the cover layer may be at least a second predetermine amount below 100. The first predetermined amount and the second predetermined amount may be the same or different. In other embodiments, the isocyanate index of the coating layer may be at least a first predetermine amount below 100, while the isocyanate index of the cover layer may be at least a second predetermined amount above 100.

In some embodiments, each of the first predetermined amount and the second predetermined amount may have a value of about 5. For example, in a particular embodiment, the isocyanate index of the cover layer may be about 95 or less, while the isocyanate index of the coating layer may be about 105 or more. As used herein, the term "about" is meant to signify the experimental and practical limits to determining the amount of each functional group present in the polyurethane system. In various other embodiments, each of the first predetermined amount and the second predetermined amount may have a value of about 10, or about 15, or about 20, or about 25; or the first and second predetermined amounts may have different values selected from the above discussed values.

For example, in a particular embodiment when each of the first and the second predetermined amounts are equal to about 10, the isocyanate index of the cover layer may be less than or equal to about 90, and the isocyanate index of the coating layer may be greater than or equal to about 110.

As a result of the above discussed differences in the isocyanate indexes, the excess of one functional group present in the coating layer may react with the excess of the other functional group present in the cover layer. This reaction thereby forms crosslinks in the cover layer. These crosslinks may be direct covalent bonds between different points on the polymer backbone, or may be linear covalent bonds forming different polymer backbones that are interlaced in a interpenetrating polymer network ("IPN"). Both of these molecular configurations are encompassed by the term "crosslinked" as that term is used herein.

As a result of this crosslinking, the cover layer may achieve increased durability. Specifically, the cover layer achieves improved scuff resistance because the thermoplastic polyurethane cover layer material includes covalent bonds that hold the polymer stands together, in addition to the weaker reversible hydrogen bonds that hold the "hard segments" of the thermoplastic polyurethane together at temperatures below the polymer's melting point.

Furthermore, also as a result of this crosslinking, the coating layer may experience increased bonding to the cover layer. Specifically, portions of the coating material may be covalently bonded with, and in-between, the cover material. Therefore, the polyurethane coating may be firmly attached to the thermoplastic polyurethane cover, and the coating layer itself may display improved durability.

As discussed above, generally the thermoplastic polyurethane material includes few chemical crosslinks prior to exposure to the coating material. However, in other embodiments in accordance with this disclosure, the thermoplastic polyurethane cover layer may be partially crosslinked by any of a variety of known methods prior to exposure to the coating material in order to further increase durability. For example, minor amounts of crosslinking agents such as glycerine, trimethylolpropane, diethanolamine, and triethanolamine may be used in conjunction with the diol chain extenders in the thermoplastic polyurethane system.

In another example, the thermoplastic polyurethane cover may be partially crosslinked by the process of isocyanate dipping, as disclosed in U.S. Pat. No. 7,217,200 to Matroni et al. mentioned above.

In yet another embodiment, the thermoplastic polyurethane cover may be partially crosslinked in accordance with the methods disclosed in U.S. Pat. No. 8,193,296, filed on Jun. 30, 2010, the disclosure of which is hereby incorporated by reference in its entirety. Specifically, this patent application discloses crosslinking a thermoplastic polyurethane through radical initiation of a double bond located on a side chain, This method may be particularly suited to partially crosslinking the thermoplastic polyurethane cover of the present disclosure because, unlike isocyanate dipping and other known isocyanate exposure related methods of crosslinking a thermoplastic polyurethane, radical initiation of a double bond does not compete with the present coating layer for the same functional groups in the cover layer.

With reference again to FIG. 1, FIG. 1 shows golf ball 100 with cover layer 104 and coating layer 106. Specifically, FIG. 1 shows a golf ball 100 prior to crosslinking between cover layer 104 and coating layer 106. As discussed below, coating layer 106 may be applied to cover layer 104 in any of a variety of application methods. Upon this application, golf ball 100 is formed.

Generally, golf ball 100 may be constructed in accordance with known golf ball constructions. Golf ball 100 is shown as a "two piece" golf ball, made up of a core 102 and a cover layer 104. However, golf balls in accordance with this disclosure may also include other layers, such as an outer core between an inner core and the cover layer, various mantle layers, etc.

Cover layer 104 may have thickness as shown by 120. Generally, thickness 120 may be on the order of about 0.5 mm to about 3 mm. Similarly, coating layer 106 may have thickness as shown by 122. Thickness 122 may generally be on the order of from about 5 µm to about 50 µm. Thickness 120 and thickness 122 are not necessary shown in FIG. 1 to any particular relative scale.

Figure 2:
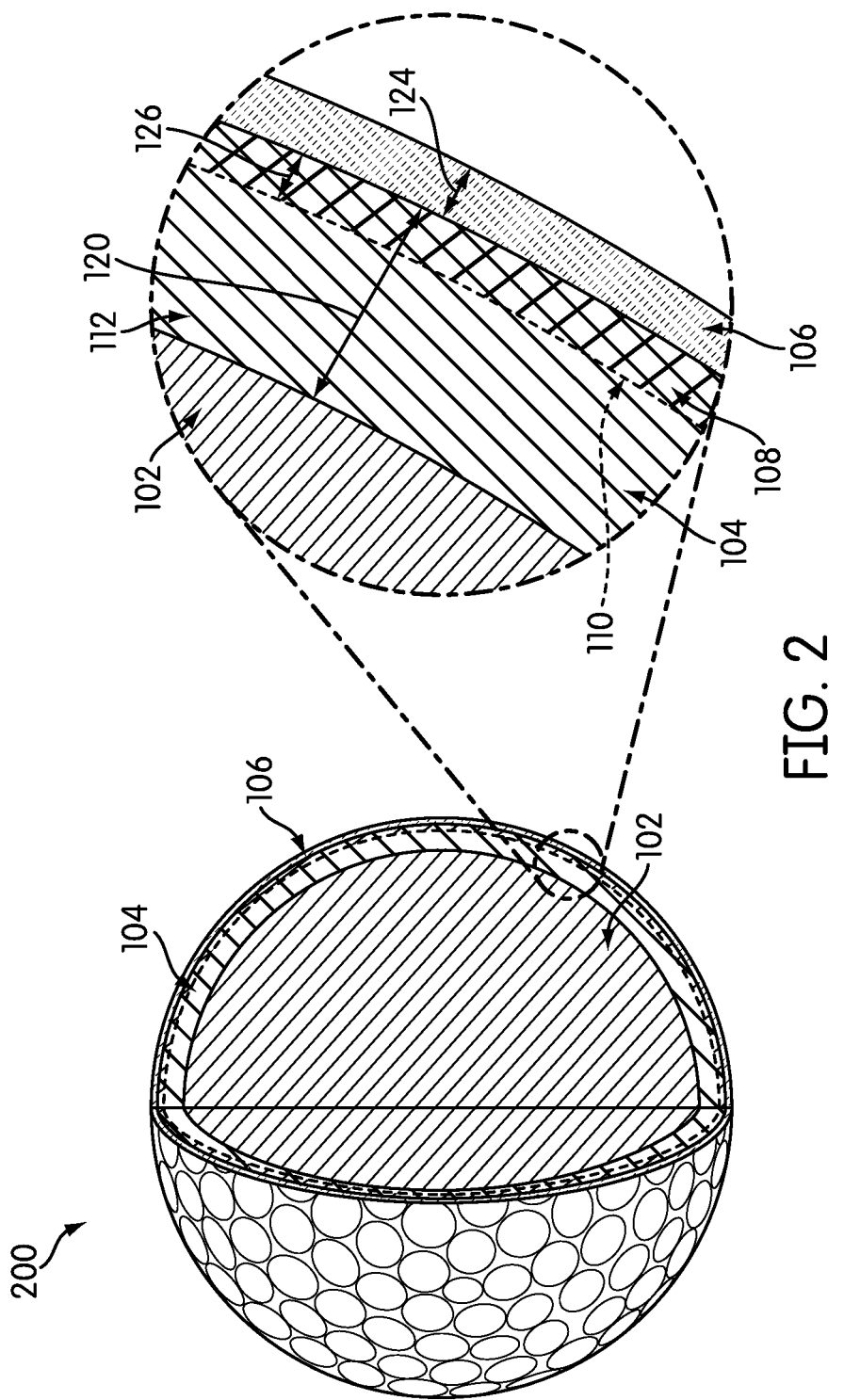
FIG. 2 shows the first embodiment of a golf ball, after crosslinking.

Golf ball 100 may subsequently undergo curing in order to cure coating layer 106 and affect crosslinking in cover layer 104. FIG. 2 shows golf ball 200 after such curing. Golf ball 200 may be a finished golf ball that is ready for use by a golfer. Coating layer 106 may have thickness 124 after curing. Thickness 124 may generally be approximately the same as thickness 122, or some thickness slightly less than thickness 122, and may be on the order of from about 5 µm to about 50 µm.

Golf ball 200 includes portion 108 of cover layer 104 that is crosslinked. Portion 108 may have thickness 126. Thickness 126 may be the depth to which crosslinking occurs down into cover layer from the interface with coating layer 106. Boundary 110 denotes the division between crosslinked portion 108 and non-crosslinked portion 112. Although boundary 110 is shown as a line in FIG. 2, the transition between crosslinked portion 108 and non-crosslinked portion 112 may be a gradual change in the degree of crosslinking present.

Thickness 126 may extend to a depth on the order of from about 3 µm to about 50 µm, or more. Thickness 126 may also be expressed a ratio relative to thickness 120 of entire cover layer 104. For example, thickness 126 may be at least about 5% of thickness 120, or at least about 10% of thickness 120, or at least about 15% of thickness 120, in various different embodiments.

Figure 3:
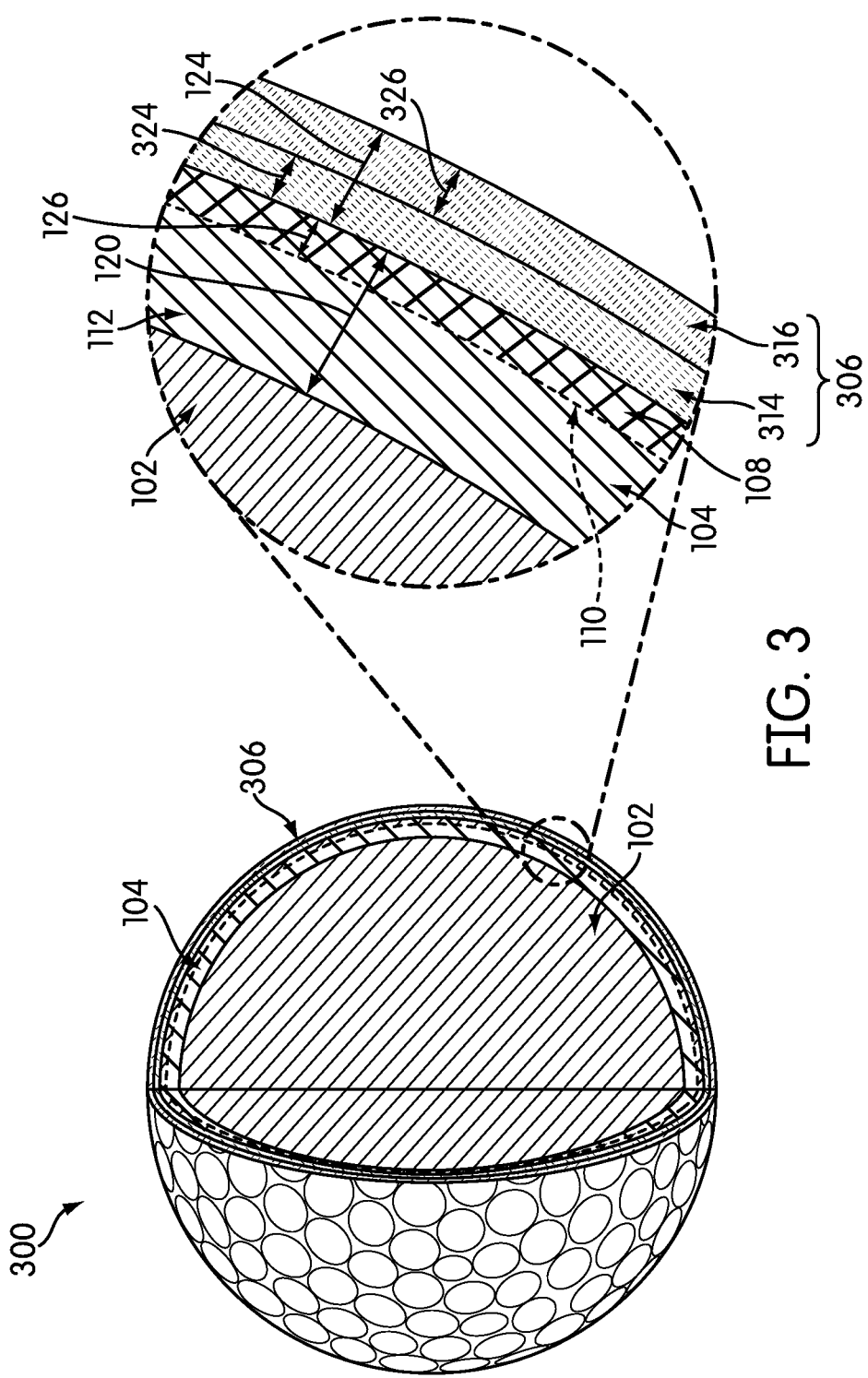
FIG. 3 shows a second embodiment of a golf ball in accordance with this disclosure, after crosslinking.

FIG. 3 shows a second embodiment of a golf ball 300 in accordance with this disclosure. Golf ball 300 is similar to golf ball 200 in most respects. However, golf ball 300 includes coating layer 306 that includes primer layer 314 and top coat layer 316. The user of primer layers for polyurethane coating systems are known in the golf ball arts. For example, U.S. Patent Application Publication No. 2004/0052970 to Ohira discloses golf ball coatings that may include primer layers, the disclosure of which is herein incorporated by reference. Generally, the use of a primer layer may allow for better adhesion between a primer layer and a cover layer, while the top coat layer may be formulated to provide a better sealant or aesthetic affect.

Golf ball 300 is shown after curing, such that portion 108 of cover layer 104 may be crosslinked with coating layer 306. Specifically, portion 108 may be crosslinked with primer layer 314. This configuration may all for golf ball 300 to be constructed using a specially formulated primer layer, having an isocyanate index as discussed above, while also using a stock commercially available top coat layer formulation.

The total thickness of primer layer 314 and top coat layer 316 may also be donated by thickness 124, and may have the values discussed above for thickness 124 as shown in FIG. 2. Primer layer 314 may have thickness 314, which may be on the order of from about 3 µm to about 30 µm for example. Top coat layer 316 may have thickness 326, which may be on the order of from about 5 µm to about 30 µm for example. JP 08182775 to Hamada et al. and assigned to Sumitomo Rubber Industries Limited discloses a golf ball coating having a primer layer and top coat, where the primer layer may have an isocyanate index that is different from 100. The disclosure of JP 08182775 to Hamada et al. is herein incorporated by reference in its entirety.

This disclosure also relates to methods of manufacturing the above discussed golf balls. Generally, golf ball in accordance with this disclosure may be manufactured in accordance with known methods for creating golf balls having thermoplastic polyurethane covers and polyurethane coatings.

Figure 4:
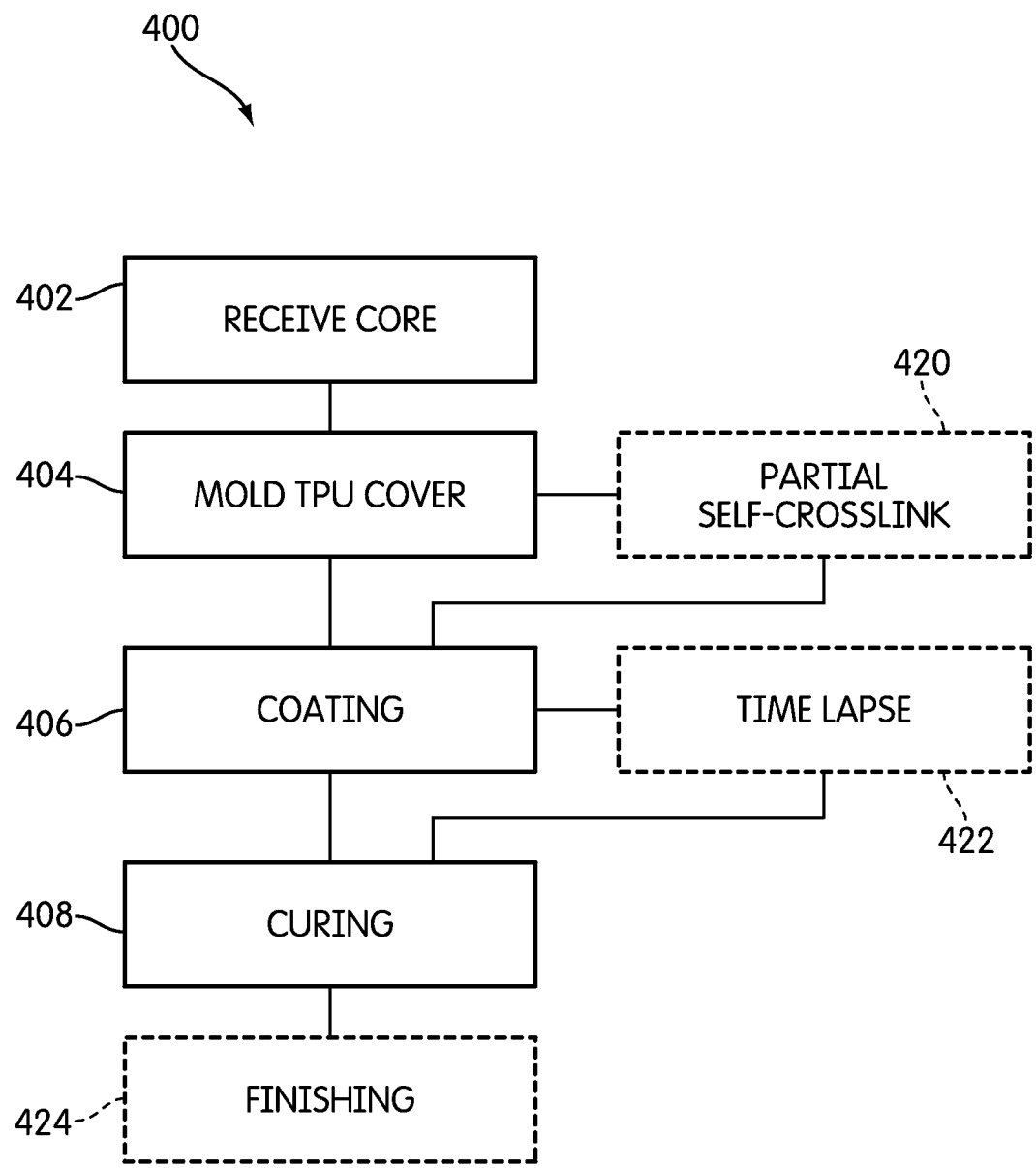
FIG. 4 is a process flow diagram showing an exemplary method for manufacturing golf ball in accordance with this disclosure.

FIG. 4 shows a process diagram for one such method 400 of manufacturing. First, step 402 of method 400 includes receiving a golf ball core. This step may occur by (for example) producing a golf ball core, or by receiving a golf ball core from a third party manufacturer. As discussed above, the core may generally be any type of golf ball core.

Next, step 404 may include molding a thermoplastic polyurethane material around the core to form a cover layer substantially surrounding the core. The thermoplastic polyurethane material may have any of the above discussed compositions. Molding step 404 may be accomplished by any of a variety of known molding techniques. In particular, molding step 404 may be a compression molding process, as injection molding may provide increased productivity and efficiency when used with a thermoplastic material such as thermoplastic polyurethane. In other embodiments, molding step 404 may be (for example) a compression molding step.

Method 400 may also include optional step 420 of partially crosslinking the thermoplastic polyurethane cover material with itself. This step may be accomplished by, as mentioned above, the methods described in U.S. Pat. No. 8,193,296, filed on Jun. 30, 2010.

Step 406 includes coating the cover with a polyurethane coating material to form a coating layer substantially surrounding the cover layer. The coating material may have any of the above described compositions. Coating step 406 may occur through any generally known coating method, such as spraying, dipping, rolling, pouring, brushing, or wiping. Coating 406 may generally apply the polyurethane coating material with a uniform thickness so as to not distort the shape of the dimples on the cover layer.

In an optional step 422, a predetermined time period may elapse between coating step 406 and a subsequent curing step 408. During this time lapse, the coating material may be allowed to sit in physical contact with the cover layer in an unreacted state. The coating material system may therefore penetrate into the cover layer, as shown in FIGS. 2 and 3. A longer predetermined time period in step 422 may generally result in a deeper depth 126 of crosslinking of the cover layer 104. In particular embodiments, the predetermined time period may be from about 5 minutes to about one hour. In other embodiments, the predetermined time period may be at least about 15 minutes, or at least about 30 minutes, or at least about 45 minutes, or at least about 1 hour, for example.

Next, method 400 may include step 408 of curing the coating layer. Curing processes for polyurethane coatings are known in the golf ball arts. For example, curing step 408 may comprise a heating step. In such embodiments, a golf ball may be heated to a temperature of at least about 35° C., or at least about 50° C., or at least about 75° C., for example. Typical heating times may be from about 5 minutes (for example, at higher temperatures) to about one hour. Curing step 408 may also take place at an elevated humidity.

As an optional final step, method 400 may also include step 424 of finishing the golf ball. For example, after the coating layer is cure, the golf ball may undergo various conventional finishing processes such as buffing, stamping and painting Therefore, as a result of the above discusses method of manufacturing, a golf ball having a thermoplastic polyurethane cover with improved scuff resistance may be manufactured using a process that need not necessary include additional steps beyond those used to cure a polyurethane coating layer.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for manufacturing a golf bail, the method comprising:
    molding a thermoplastic polyurethane material around a golf ball core to form a cover layer substantially surrounding the core, the thermoplastic polyurethane material having an isocyanate index of less than or equal to about 95;
    coating the cover with a polyurethane coating material comprising 20 to 65 weight percent solvent to form a coating layer substantially surrounding the cover layer, the polyurethane coating material having an isocyanate index of greater than or equal to about 105;
    allowing the polyurethane coating material to remain in an unreacted state on the cover for a period of time from about 5 minutes to about one hour to penetrate into the cover laver; and
    curing the coating layer, such that the thermoplastic polyurethane cover layer crosslinks with the polyurethane coating material, wherein the step of curing the coating layer comprises heating the golf ball and crosslinking the cover layer with the polyurethane coating material to a depth into the cover layer of at least 5% of the thickness of the cover layer.

2. The method according to claim 1, wherein the step of molding the thermoplastic polyurethane material around the core comprises injection molding.

3. The method according to claim 1, wherein the step of coating the cover with a polyurethane coating material to form a coating layer and the step of curing the coating layer forms a coating layer having a thickness of from about 5 μm to about 50 μm.

4. The method according to claim 1, wherein the method further comprises a step of partially crosslinking the thermoplastic polyurethane material of the cover layer with itself.

\* \* \* \* \*